Jan. 20, 1959     F. L. PRATT     2,869,853
TARE CORRECTION APPARATUS
Filed July 14, 1954
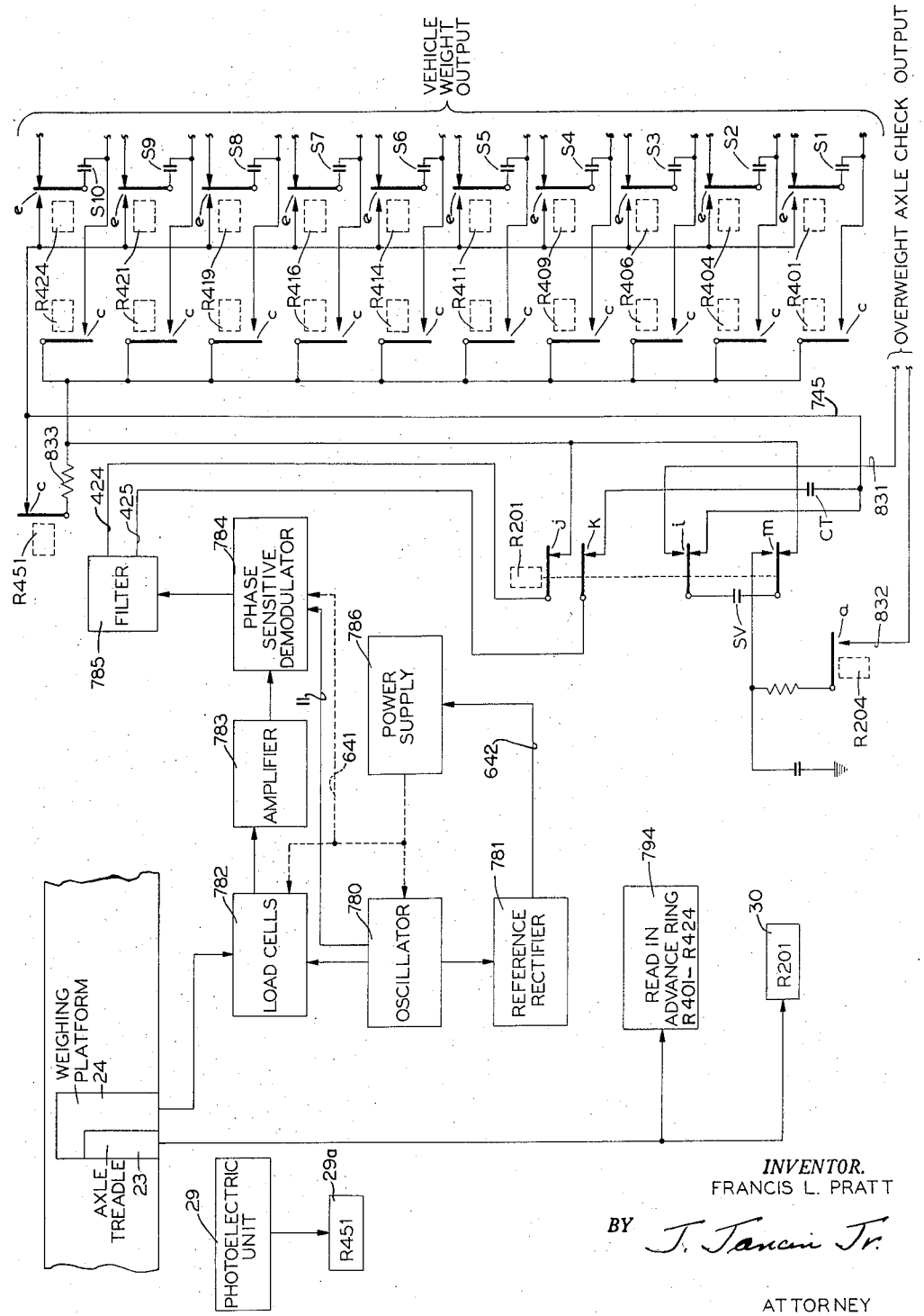
*INVENTOR.*
FRANCIS L. PRATT
BY *J. Tancin Jr.*
ATTORNEY United States Patent Office 2,869,853
Patented Jan. 20, 1959

2,869,853

TARE CORRECTION APPARATUS

Francis L. Pratt, Endwell, N. Y., assignor to International Business Machines Corporation, New York, N. Y., a corporation of New York Application July 14, 1954, Serial No. 443,351

6 Claims. (Cl. 265—27)

This invention relates to an automatic tare correction apparatus for use with an electrical weighing system.

This invention which also pertains to an automatic tare correction apparatus for use with a dynamic vehicle axle weighing toll highway recorder system, is particularly adapted for, but not limited to, a dynamic weighing toll highway recorder system such as is shown and described in copending U. S. patent application Serial No. 443,264, filed on July 14, 1954, by J. M. Cunningham et al.

The toll highway recorder apparatus at each of the entrance and exit stations in the aforementioned toll highway recorder system includes an axle detecting treadle and an axle weighing platform, each of which is arranged across a roadway and each of which is responsive to vehicle axles passing thereover. As a result, the number of axles per vehicle and the weight of each axle may be determined dynamically as vehicles in motion approach a station toll booth. A vehicle detecting means, for example a photoelectric gating device, is also utilized so as to signify the presence of a vehicle at a station prior to the first axle thereof passing over the treadle. This will afford, among other things, a means for automatically grouping the axles carried by the vehicle. Thus, inasmuch as the weight of each vehicle axle may be determined by the axle weighing platform and associated apparatus, and since the axles per vehicle may be grouped due to the photoelectric gating device, the dynamic weight of each vehicle may be determined by a combination thereof.

Any weighing apparatus has a tare due to the weighing platform per se, for instance, among other things, which should be subtracted from the gross weight indicated by the weighing apparatus when an object is supported by the weighing platform thereof, so as to provide the true or actual weight of the object. That is, in the preferred embodiment of the present invention the tare is a deduction of weight made as an allowance for the weight of the weighing apparatus including the weighing platform in order that the true weight of the object being weighed may be obtained. Furthermore, the present invention provides an automatic weighing system tare correction apparatus, whereby the tare of the weighing apparatus as indicated by a magnitude of voltage proportional to the tare is deducted and eliminated from the magnitude of voltage representing the so-called gross weight obtained when an object is being weighed, in order to afford another magnitude of voltage proportional to the true weight of the object.

A primary object of this invention is to provide apparatus for isolating a weighing apparatus tare representing voltage in an analog weighing system from a gross weight representing voltage obtained by the weighing apparatus supporting an object so as to afford a true weight representing voltage indicative of the actual weight of the object weighed.

Another object of this invention is to provide an improved automatic tare correction apparatus for an electric weighing system.

Another object of this invention is to provide automatic means in a weighing system to correct for zero drift resulting from changes in the system.

Still another object of this invention is to provide in an axle weighing system an automatic tare correction apparatus which affords a single setting that is effective for successive axles of a vehicle.

Other objects of the invention will be pointed out in the following description and claims and illustrated in the accompanying drawings, which disclose, by way of examples, the principle of the invention and the best mode, which has been contemplated, of applying that principle.

*General weighing system description*

Referring to the drawing which is a schematic diagram, somewhat diagramamtic in character, of a preferred embodiment of the present invention, a toll recorder system may be located in the proximity of a weighing platform 24 and an axle treadle 23 so as to cause the conversion of an applied weighing platform axle load in pounds to a related vehicle classification value. This value is determined by detecting a predetermined relationship between the relative magnitude of the true vehicle weight representing voltage obtained by adding two or more axle weight representing voltages as determined by the axles per vehicle, and some predetermined portion of the regulated load voltage from power supply 786, said portion being referred to herein as a voltage standard. It is desired to point out at this time that all of the apparatus, circuits and operations referred to herein are shown and described in detail in the afore-mentioned copending Cunningham et al. patent application.

The oscillator 780 generates a very nearly constant amplitude output voltage at a frequency of approximately 3 kilocycles (kc.). This alternating current (A. C.) output voltage is applied as an excitation voltage to the weighing platform actuated load cells 782 which are of the general type shown and described in Ruge Patent No. 2,472,047, issued on May 31, 1949. Furthermore, the oscillator A. C. output voltage is applied to a reference rectifier 781 for reasons to be made clear shortly, and as a control voltage to phase sensitive demodulator 784 via line 11. Thus, the output of load cells 782 is an A. C. voltage whose magnitude is proportional to the axle load applied to weighing platform 24, and is dependent upon the magnitude of the aforementioned load cell excitation voltage.

The voltage output from the load cells is amplified by a carrier amplifier 783 whose gain is very nearly constant, and for all practical purposes is constant. The A. C. output of amplifier 783, in turn, is rectified by a phase sensitive demodulator 784 whose output is a direct current (D. C.) voltage which is directed to filter 785. This D. C. voltage which is related to the axle load applied to the weighing platform, is stored in a select one of a plurality of axle weight storage condensers S1–S10 associated with the output side of filter 785. Hence, the voltage stored in any one of the axle weight storage condensers will be related, and in fact proportional, to the dynamic axle load applied to weighing platform 24, the magnitude of the A. C. excitation voltage applied to load cells 782 from oscillator 780, the amplification constant of amplifier 783, and the operation of the demodulator 784 at the period when a select axle weight storage capacitor S1–S10 is connected to filter circuit 785.

Thereafter, a storage condenser, such as condenser SV or an axle per vehicle combination consisting of two or more select axle weight condensers S1–S10, for instance, may be connected to a voltage comparing circuit (not shown) for comparison on a step-by-step basis with a plurality of voltage standards of varying magnitude obtained from regulated power supply 786. This comparison as regards the axles per vehicle condenser combination will result in the determination of a vehicle classification value which is based on the vehicle weight obtained by adding the several axle loads associated with the vehicle and applied to the weighing platform at the several times when select succeeding axle weight condensers corresponding to the axles per vehicle, were connected one at a time to filter 785. In view of the fact that the apparatus for determining the vehicle classification is not a part of this invention, and since the same is fully described in the aforementioned copending Cunningham et al. patent application, it will not be described any further herein.

The reference rectifier 781 is used to convert a portion of the oscillator 780 A. C. output voltage to a corresponding D. C. voltage value. This D. C. voltage is used to control, in part, the magnitude of the regulated power supply 786 load voltage applied to line 641. This is done by directing the output from reference rectifier 781 along line 642 to power supply 786 so as to, in effect, correlate the magnitude of the regulated power supply D. C. voltage along line 641 with the D. C. reference voltage along line 642. In fact, the correlation of these voltages is such that the ratio therebetween is maintained a constant. The preceding circuits and apparatus are shown and described in detail in the aforementioned copending patent application, and therefore need not be described in detail herein. Thus, in view of the fact that the voltage along line 641 is proportional to the reference voltage along line 642, and inasmuch as the axle weight representing voltages stored in the aforementioned storage condensers are generated by oscillator 780 which also supplies the aforesaid reference voltage, and since the aforementioned comparing circuit (not shown) compares the D. C. weight representing voltages stored in the condensers S1–S10 to various voltage standards based on the regulated voltage along line 641, the vehicle classification arrived at by the toll recorder system will be based on the true weight of a vehicle, the said weight being represented by the axle weight representing voltages stored in select axles per vehicle condensers.

*Circuit description and operation*

Prior to the detection of a vehicle at a toll recorder station, photo-control relay R451 represented within block 29a is maintained in a de-energized status by the photoelectric gating apparatus unit 29 whose operation is also described in detail in the copending Cunningham et al. application. Hence, the weighing apparatus tare representing voltage due to the weighing plaform, changes in temperature, etc., and appearing along filter 785 output lines 424 and 425 will be applied to a tare storage condenser CT via a circuit completed from line 424 through contacts R201*j*, resistor 833, contacts R451*c*, condenser CT, and contacts R201*k* to line 425. The voltage stored in condenser CT will be proportional to, and therefore indicative of, the magnitude of the weighing system tare.

The tare storage condenser CT is one which is extremely large as compared to any of the axle weight storage condensers S1–S10. For example, capacitor CT may be of the magnitude of 2000 microfarads, whereas each of the storage condensers S1–S10 may have a value in the neighborhood of 0.5 microfarad.

Normally closed contacts R451*c* connect resistor 833 in shunt with the storage condensers S1–S10 as well as with the overweight storage condenser SV, so that only tare storage capacitor CT is caused to be charged by the weighing system tare representing voltage. This will take place until relay R451 is energized due to detection of a vehicle by photoelectric unit 29. Thus, assuming that the read-in advance ring contacts R424*c* and R424*e* are in an operated status so as to condition condenser S10 for axle weight storage, there will not be a tare representing voltage entered into storage condenser S10 so long as the absence of a vehicle is detected and contacts R451*c* are closed. The read-in advance ring 794 is controlled by the operation of treadle 23 so that consequent upon a vehicle axle passing over the treadle, the relay ring including relays R401–R424 (not shown) is advanced one relay position. Of course, any relay ring similar to the one shown and described in the copending Cunningham et al. application, in which a succeeding relay is energized in response to each advance signal applied to the ring, will do satisfactorily.

When contacts R451*c* are caused to open due to the energization of relay R451 in response to the detection of a vehicle by photoelectric unit 29, the voltage representing the weighing system tare will remain stored in capacitor CT. It will be recalled that photo-control relay R451 will become energized prior to the first axle of a vehicle passing over treadle 23 and weighing platform 24. With an axle load applied to weighing platform 24, the D. C. gross weight representing signal directed to lines 424 and 425 is applied to a conditioned-for-operation axle weight storage condenser, such as condenser S10 for example, which is connected in series circuit at this time with tare storage condenser CT via a circuit completed from line 424 through contacts R201*j* and R424*c*, condenser S10, contacts R424*e* normally open (n/o), line 745, condenser CT, and contacts R201*k* to line 425. This gross weight representing signal will be related to the true axle weight and will include the weighing system tare. Thus, to obtain the true axle weight representing voltage, it will be necessary to subtract the tare representing voltage from the gross weight representing voltage. This is obtained automatically in the present invention by utilizing for readout the voltage occurring across the capacitor S10, which is representative of the true axle weight. Only a negligible portion of the voltage change resulting from the addition of the axle load to the weighing system apparatus will be developed across tare storage condenser CT because of its extremely large capacity, i. e., 2000 microfarads for example, as compared to the capacitive value of axle weight storage condenser S10, e. g., 0.5 microfarad. Hence, the voltage stored in axle weight storage condenser S10 will for all practical purposes be the difference between the gross weight representing voltage and the tare representing voltage stored in condenser CT; i. e., an axle weight representing voltage which is indicative of the true axle weight.

Relay R201 shown to be within block 30, is controlled for operation by treadle 23 so that the axle weight representing voltage applied to a select axle weight storage condenser is cut off at the correct time of axle movement over weighting platform 24. This, of course, is necessary inasmuch as the axles are weighed dynamically, i. e., while in motion over weighing platform 24, and it is necessary to store the varying D. C. output from filter 785 when it is of a magnitude corresponding to the weight load in pounds. Contacts R451*c* will close under control of the photoelectric gating unit 29 during the period that the photoelectric light beams traversing the roadway are unbroken as occurs between vehicles so as to direct, once again, a weighing system tare representing voltage to condenser CT.

*Summary*

The weighing system apparatus tare representing voltage is normally directed to lines 424 and 425 via load cells 782, amplifier 783, demodulator 784, and filter 785. In view of the fact that during the time photoelectric unit 29 detects the absence of a vehicle, relay R451 is de-energized, contacts R451c are closed so as to direct the tare representing voltage from filter 785 to tare storage condenser CT. No portion of this tare representing voltage is applied to any of the axle weight storage condensers S1–S10 in view of the fact that these latter mentioned condensers are effectively shunted by the closed contacts R451c. Upon the detection of a vehicle by the photoelectric unit 29, relay R451 is energized to thereupon cause contacts R451c to separate. As a result, a select axle weight condenser from the group of condensers S1–S10, i. e., the one select condenser conditioned for operation by the position of read-in advance ring 794 for governing the contacts of relays R401–R424, is connected in series circuit with tare storage condenser CT across lines 424 and 425. Hence, in response to a vehicle axle passing over weighing platform 24, a so-called gross weight representing voltage which is produced by load cells 782 and which includes the tare representing voltage as well as the true axle weight representing voltage, is applied to the aforementioned series circuit connected condensers. The tare representing voltage stored in condenser CT is such as to effectively subtract an equal value voltage from the afore-mentioned gross weight indicating voltage, to thereby cause the difference voltage to be applied to the axle weight storage condenser in series circuit with tare storage condenser CT. This so-called difference voltage is, of course, the true axle weight representing voltage that is indicative of the actual axle weight.

Inasmuch as the afore-mentioned series circuit connected condensers, e. g., condensers CT and S10, may have capacitance values of 2000 microfarads and 0.5 microfarad, respectively, the axle weight representing voltage is stored in these two condensers according to the inverse capacitive ratio based on a voltage divider principle. However, due to the great capacitive difference between these condensers, a very insignificant portion of the axle weight representing voltage is "lost" to the tare storage capacitor CT. To clarify this point, let it be assumed that a 1000 pound tare representing voltage be stored in condenser CT, and a 40,000 pound axle load thereafter be supported by weighing platform 24 so as to afford a 41,000 pound gross weight representing voltage. The tare representing voltage would be subtracted from the gross weight representing voltage for reasons already stated, to thereby afford a 40,000 pound axle weight representing voltage. This latter voltage would then appear across the series circuit connected condensers. Thus, a 39,990 pound representing voltage would be stored in axle weight condenser S10 due to the 4,000 to 1 capacitor ratio of condenser CT to condenser S10. The accuracy of this system would then be in the neighborhood of 99.97%. It is clear, however, that without the automatic tare correction provided by the present invention, all of the 41,000 pound gross weight representing voltage would have been stored in axle weight condenser S10 to cause a 2.5% error.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A toll highway recorder system comprising a treadle having an associated switching apparatus which is operated in response to a vehicle axle passing over said treadle, a vehicle axle supporting and weighing apparatus arranged with respect to said treadle so as to provide an axle weight output during the period said switching apparatus is operated, a variable voltage emitting device controlled by said weighing apparatus for providing a voltage output which is proportional to the tare of said weighing apparatus in the absence of said weighing apparatus supporting a vehicle axle and for providing a voltage output which is proportional to a gross weight equal to the sum of the tare of said weighing apparatus and an axle weight applied to said weighing apparatus, photoelectric means for detecting the presence of a vehicle prior to the first axle thereof passing over said treadle, an electrical axle weight representing voltage storage condenser, an electrical tare representing voltage storage condenser, a photoelectric means controlled relay, an electrical circuit for connecting said condensers in series circuit to said voltage emitting device, said axle weight and said tare storage condensers having such an electrical storage capacity ratio as to cause substantially all of a gross weight representing voltage applied from said voltage emitting device to a series circuit combination of the said condensers to be stored in said axle weight storage condenser, and normally closed contacts common to said relay for shunting said axle weight representing voltage storage condenser prior to the detection of a vehicle so that the tare representing voltage is entered into only the tare voltage storage condenser.

2. A toll highway recorder system comprising a treadle having an associated switching apparatus which is operated in response to a vehicle axle passing over said treadle, a vehicle axle supporting and weighing apparatus arranged with respect to said treadle so as to provide an axle weight output during the period said switching apparatus is operated, a variable voltage emitting device controlled by said weighing apparatus for providing a voltage output which is proportional to the tare of said weighing apparatus in the absence of said weighing apparatus supporting a vehicle axle and for providing a voltage output proportional to a gross weight equal to the sum of the tare of said weighing apparatus and an axle weight applied to said weighing apparatus, photoelectric means for detecting the presence of a vehicle prior to the first axle thereof passing over said treadle, and axle weight representing voltage storage condenser, a tare representing voltage storage condenser of a capacity such that the capacitive ratio of said tare condenser to said axle weight condenser is substantially 4000 to 1, an electrical circuit for connecting said condensers in series circuit to said voltage emitting device, a normally de-energized photoelectric means controlled relay, and normally closed contacts common to said relay for shunting said axle weight representing voltage storage condenser prior to the detection of a vehicle so that the tare representing voltage is entered into only the tare voltage storage condenser.

3. A toll highway recorder system according to claim 2, wherein the value of said axle weight representing voltage storage condenser is 0.5 microfarad and the value of said tare representing voltage condenser is 2000 microfarads.

4. A toll highway recorder system comprising a treadle having an associated switching apparatus which is operated in response to a vehicle axle passing over said treadle; a vehicle axle supporting and weighing apparatus arranged with respect to said treadle so as to provide an axle weight output during the period said switching apparatus is operated; a voltage emitting device controlled by said weighing apparatus for providing a voltage output proportional to the tare of said weighing apparatus in the absence of said weighing apparatus supporting a vehicle axle and for providing a voltage output proportional to a gross weight equal to the sum of the tare of said weighing apparatus and a vehicle axle load applied to said weighing apparatus; means for detecting the presence of a vehicle prior to the first axle thereof passing over said treadle; an electrical axle weight representing voltage storing unit; an electrical tare representing voltage storage unit, said axle weight and said tare storage units having such an electrical unit storage capacity ratio as to cause substantially all of a gross weight representing voltage applied from said voltage emitting device to a combination of the said axle weight and said tare storage units to be stored in said axle weight storage unit; and a vehicle detecting means controlled electrical circuit means for connecting said voltage emitting device to said tare storage unit prior to the detection of a vehicle so as to store a tare representing voltage therein, and for connecting said voltage emitting device to the combination of said tare and said axle weight storage units in response to the detection of a vehicle in such a manner that said stored tare representing voltage reduces the gross weight representing voltage by an amount equal to the tare representing voltage so as to apply to said axle weight storage unit a magnitude of voltage indicative of the vehicle axle weight.

5. A toll highway recorder system according to claim 4 wherein said axle weight storage unit includes a first condenser, said tare storage unit includes a second condenser having a capacity substantially 4000/1 of the capacity of said first condenser, and said electrical circuit means includes a switch for connecting said first and said second condensers in series circuit combination in response to the detection of a vehicle by said detecting means.

6. An electrical weighing system of the class described for weighing objects dynamically comprising a weighing apparatus for supporting objects in motion; a variable voltage emitting device controlled by said weighing apparatus for providing a voltage output proportional to the tare of said weighing apparatus in the absence of said weighing apparatus supporting an object and for providing a voltage output proportional to a gross weight equal to the sum of the tare of said weighing apparatus and an object load applied to said weighing apparatus; photoelectric means for detecting the presence of an object relative to said weighing apparatus; a weighing apparatus tare representing voltage storage unit; an object load representing voltage storage unit, said weighing apparatus tare and said object load storage units having such an electrical storage capacity ratio as to cause substantially all of a gross weight representing voltage applied from said voltage emitting device to a predetermined combination of the said units to be stored in said object load storage unit; and object detecting means governed electrical circuit means for connecting said voltage emitting device to said tare storage unit in the absence of said weighing apparatus supporting an object, and for connecting said voltage emitting device to the predetermined combination of said weighing apparatus tare and said object load storage units in response to the detection of an object, said predetermined combination being one whereby the polarity of the tare representing voltage stored in said tare storage unit is such as to reduce said gross weight representing voltage by an amount equal to the tare representing voltage so as to effect storage of the object load representing voltage in said object load storage unit.

References Cited in the file of this patent

UNITED STATES PATENTS

| | | |
|---|---|---|
| 2,083,783 | Haegele | June 15, 1937 |
| 2,610,052 | Macgeorge | Sept. 9, 1952 |
| 2,646,270 | Thayer | July 21, 1953 |
| 2,673,082 | Thurston | Mar. 23, 1954 |

FOREIGN PATENTS

| | | |
|---|---|---|
| 880,182 | France | Mar. 16, 1943 |